UNITED STATES PATENT OFFICE.

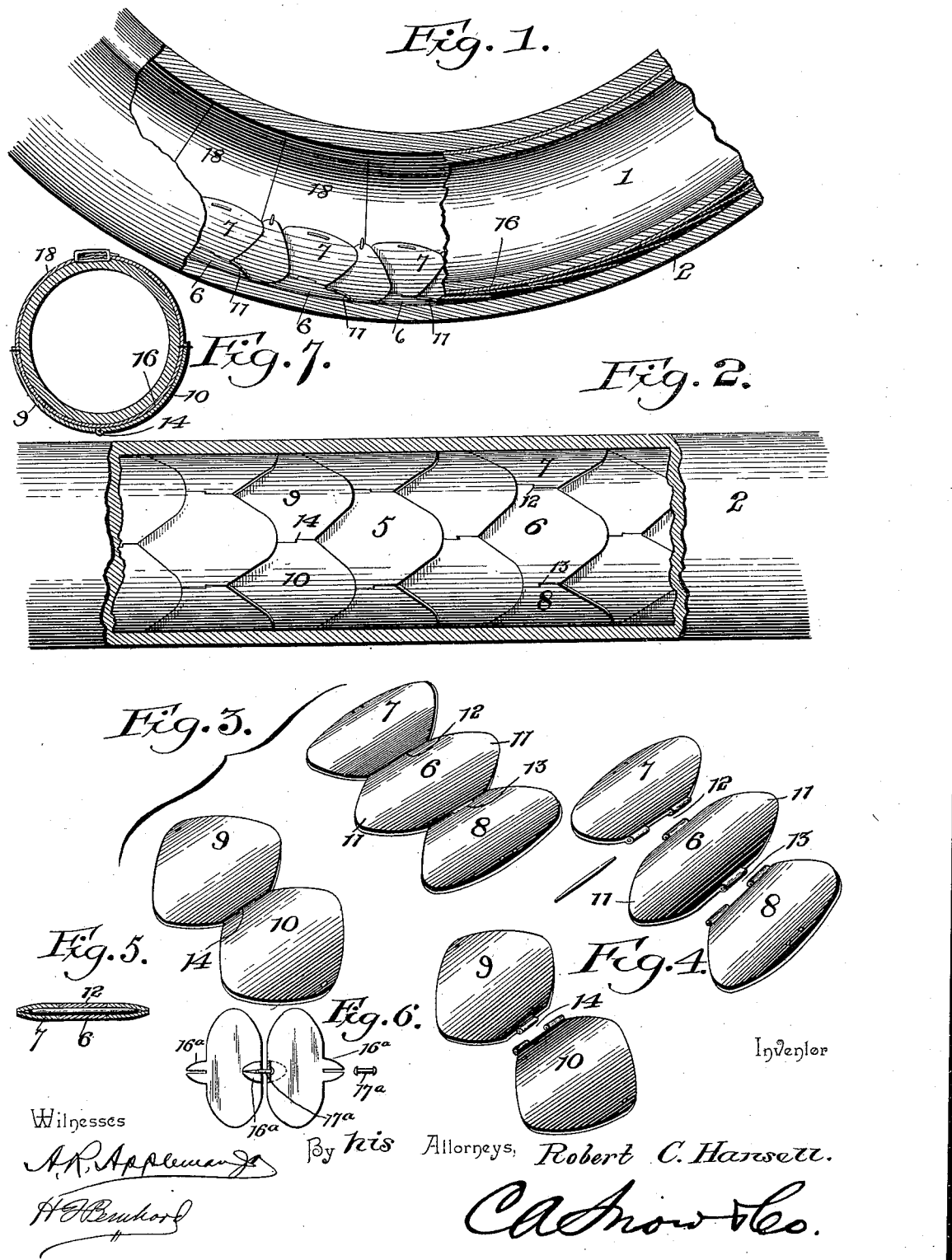

ROBERT CLARK HANSELL, OF SAN ANTONIO, TEXAS.

ARMOR FOR PNEUMATIC TIRES.

SPECIFICATION forming part of Letters Patent No. 602,132, dated April 12, 1898.

Application filed August 13, 1897. Serial No. 648,129. (No model.)

*To all whom it may concern:*

Be it known that I, ROBERT CLARK HANSELL, a citizen of the United States, residing at San Antonio, in the county of Bexar and State of Texas, have invented a new and useful Armor for Pneumatic Tires, of which the following is a specification.

My invention relates to improvements in inflatable tires of that class wherein an inner tube is designed to be inflated by pumping air into the same; and the object that I have in view is to provide an improved means for preventing the inner air-tube from being penetrated or punctured by tacks, nails, or other sharp objects, but without appreciably detracting from the resiliency or elasticity of the tire.

In my invention I provide an armor as a protection for the inner tube comprising a series of overlapping plates or scales arranged and combined in a novel manner to afford protection to the inner air chamber or space of the tire and to allow the tire to have the expansion and freedom of movement necessary in tires for bicycles and other vehicles. The protective armor is of metal plates or scales overlapping each other in a peculiar manner and hinged or flexibly connected together and to a fabric layer as a medium for holding the plates or scales in position. The joints between the scales or plates extend longitudinally or circumferentially of the tire as distinguished from transversely-arranged and hinged plates or scales, and this longitudinal disposition of the hinge-joints between the scales or plates affords to the armor all the flexibility or pliancy which it is necessary to possess to yield or give when the vehicle is in use, while at the same time the armor effectually protects the inner tube from penetration and puncture by obstacles in the path; and the invention further consists in the novel combination, construction, and arrangement of parts, which will be hereinafter fully described and claimed.

To enable others to understand my invention, I have illustrated the preferred embodiment thereof in the accompanying drawings, forming a part of this specification, and in which—

Figure 1 is a longitudinal vertical section of an inflatable tire provided with my puncture-proof armor. Fig. 2 is a plan view of the tire with the outer layer or inclosing sheath omitted. Fig. 3 is a detail perspective view of a series of the scales or plates which, in connection with similar series of scales or plates, form the armor for the tire. Fig. 4 is a detail perspective view of the individual plates or scales which are designed to be flexibly connected together to form two of the transverse series of scales or plates. Figs. 5 and 6 are views of other embodiments of my invention, illustrating different forms of the hinge-joints between the plates or scales. Fig. 7 is a transverse section through the tire with the armor applied thereto.

Like numerals of reference denote corresponding parts in all the figures of the drawings, referring to which—

1 designates an inner tube, and 2 is the outer tube or sheath of an inflatable "pneumatic" tire of any suitable or preferred construction to which my invention may be applied or in which it may be embodied.

My invention consists in the provision of a puncture-proof armor 5 interposed between the layers or tubes of an inflatable tire, and this armor consists of a plurality of plates or scales connected to form transverse series of plates arranged to overlap each other in a manner to afford a continuous metallic surface over the tread portion of the tire. In Fig. 3 of the drawings I have shown two series of plates adapted to be arranged alternately in relation to each other to have the hinges break joints with each other longitudinally with respect to the tire, and in Fig. 4 the individual members of the two series of plates or scales are shown. One transverse series of plates consists of the members or scales 6, 7, and 8, while the other series of plates consists of the members 9 and 10. The triple series of plates has its central member 6 pointed at both ends to form the tongues 11 11; but the side plates 7 8 are beveled on their adjacent edges for a part of their length only to enable them to be properly attached to the central member 6 by the hinge-joints 12 13. The other series of plates 9 and 10 are double-pointed at both ends, and they are joined together by a single hinge-joint 14.

The transverse series formed by the plates 9 10 are of sufficient area to extend across the tread-surface of the tire, or that surface which rides upon the ground and is exposed to penetration by sharp obstacles in its path, and in like manner the other series of plates 6, 7, and 8 are of such size as to extend across the tread-surface of the tire, so as to coöperate with similar series of plates in forming the protective armor for the inner tube of the tire.

In applying my armor to a tire a series of the broad plates 9 and 10 are first applied to the inner tube, then a series of the three plates 6 7 8, and are adjusted to have the tongues 11 of the central plate 6 fit to the hinged part of the plates 9 and 10 and to bring the hinge-joints 11 and 12 of the triple series out of alinement with the single hinge of the double series 9 and 10. Then another double series of plates 9 and 10 is applied to overlap the ends of the triple plates and to have the ends of the plates of the double series bear upon the hinge-joints 12 and 13, and so on throughout the circumference of the inner tube of the tire. It will thus be seen that my armor for the inner tube consists of alternate series of plates of unequal number, in which the hinge-joints of each series of plates are out of alinement longitudinally of the tire with the hinge joint or joints of adjacent series of plates both in front and rear thereof. The series of plates or scales overlap each other to afford a continuous barrier or surface over the tread portion of the tire to prevent any sharp obstacle from penetrating the inner tube, and the hinge-joints of the metallic armor are all arranged longitudinally with respect to the tire, so as to enable the plates or scales to flex or give in a transverse direction when the tire is exposed to pressure by riding upon the ground. Any slight longitudinal or circumferential expansion of the tire is compensated for by having the overlapping scales work or slide upon each other, and thus the armor is made to adjust and accommodate itself to expansion of the tire in a longitudinal direction as well as to give or yield transversely when it strikes on one side or the other an obstacle in its path.

In my improved armor the hinge-joints between the scales or plates are necessarily restricted to extending in a direction longitudinally or lengthwise of the tire, and this arrangement of the joints possesses decided advantages over joints which run crosswise of the tire, because the hinges allow the plates to spread readily with the tire under pressure. The plates or scales, being comparatively short and arranged to overlap each other, perform the office of cross-hinges, as they yield just as readily, if not more so, to the pressure that brings a cross-hinge into action and are also capable of yielding at the same time to pressure in other directions. To illustrate this last statement, suppose the wheel in turning has reached a point where on a plane surface the cross-hinge of an armor would be called into action and suppose also that at this juncture a rock strikes to the right or left of the center of the tire. Under these circumstances a cross-hinge could not yield readily in more than one direction; but in my construction the plates would readily yield to the pressure of the obstruction without exposing the inner tube to injury. The plates constructed, hinged, and arranged as described yield to pressure from any and every direction, and they thus accommodate themselves to impressions made upon the outside surface of the tire, as well as affording the necessary puncture-proof armor to the inner air-tube of the tire.

The plates are quite small in size, which enables me to utilize waste pieces of metal in their manufacture to form parts of my armor for inflatable tires. The small size of the plates or scales is also advantageous for the reason that they offer less resistance to pressure than larger plates, and they yield individually and in a great measure independently to the contact of small objects, thus preserving the elasticity of the tire.

The plates or scales are made of metal—as, for instance, aluminium, steel—celluloid, paper, or sheet metal or any other appropriate material.

In the drawings I have shown the scale-like armor applied to an inner layer of fabric, (indicated at 16 in the drawings.) The side edges of the transverse series of plates are attached to this fabric layer 16—as, for instance, by stitching the outside edges of the plates to the fabric layer; but this method of fastening the parts in place may be changed. The inner layer of fabric 16 is cut at suitable intervals to provide the tongues 18, which are adapted to pass around the tube without wrinkling, and the edges of these tongues may be laced together on the inner side of the tire which bears upon the wheel-rim. I do not desire, however, to limit myself to this particular means for attaching the series of plates or scales to the tire, because the plates may be attached to the inner tube or the outer tube or to a tube or cover of any material or form.

Various changes in the form and proportion of parts may be made without departing from the spirit or sacrificing the advantages of my invention.

I attach importance to the alternate series of unequal number of plates and to the arrangement thereof in alternate longitudinal relation, so as to have the hinge-joints overlap in the direction of the length of the tire, because such provision affords protection to the division-lines between the plates. This arrangement also provides for the multiplication of the plates to accommodate the armor to tires of different sizes without interfering with the elasticity or resiliency of the tire. My invention comprehends the use of a sufficient number of plates in each series to protect the size as circumstances may require, the number of plates in each series being governed by the size of the tire and by the kind of material used. When the number of plates in each series is increased, the size of the individual plates must necessarily be correspondingly diminished, and when the size of the plates is changed then their form is also changed to comply with my invention. For instance, to construct an armor of steel for a large carriage-wheel an increased number of plates, which differ in size and form, must be employed than when the tire is constructed of aluminium for a small light bicycle. While I have shown one series as consisting of two plates and the other series of three plates, I do not restrict myself to the use of the double and triple plates, but reserve the right to vary the number of plates in each series according to the extent of the surface to be protected and according to the size of the plates employed.

In the form of hinge shown more particularly by Figs. 3 and 4 of the drawings to connect the plates of each series together I prefer to use a pintle or pivot which tapers slightly from the center toward the ends, and this pivot is shorter than the combined length of the flaps or ears which embrace the pivot, so that the ends of the pivot terminate in two of the ears attached to one of the plates. This pintle thus engages with the middle ear on one plate and terminates within the pair of ears on the other plate, said pair of ears having their outer ends closed down upon the ends of the pintle. The pintle is thus confined in position to render effective service without interfering materially with the plate that overlaps the hinge, and this form of hinge is especially advantageous in a tire-armor of this character, because it permits the required curving of the armor. I may also employ the form of hinge shown by Figs. 5 and 6 of the drawings, in which a double-headed pivot 15 is connected to the ears 16ª on the adjacent edges of the pair of plates or scales. The ears 16ª are folded or turned over upon the neutral or rear face of the plates, and said ears are slitted to receive the shank of the headed pintle. The bent ears provide sockets in which are received the headed ends of the pivot 17ª, the shank of which passes through the slits in the ears. This form of hinge connection provides a means for securely holding the plates together and at the same time allows the plates or scales to have the necessary freedom of play or movement with relation to each other.

Having thus fully described my invention, what I claim as new, and desire to secure by Letters Patent, is—

1. The combination with a tire, of a puncture-proof armor comprising a plurality of transverse series of overlapping plates or scales, each pair of adjacent series of plates being composed of plates or scales of unequal number and each series of scales or plates connected flexibly together by hinge-joints which lie in the direction of the length of the tire, the hinge-joints of each series of plates being out of line with the corresponding joints of the scales on opposite sides thereof, substantially as described.

2. The combination with a tire, of a puncture-proof armor therefor comprising a plurality of transverse series of plates of unequal number, the alternate series consisting of a number of plates hinged together at their adjacent edges, and the intermediate series consisting of other plates hinged together and arranged to lap the alternate series of plates lengthwise of the tire; all the joints of the plates extending in the direction of the length of the tire, and the hinges of contiguous series of plates being out of line with each other, for the purposes described, substantially as set forth.

3. A flexible armor for inflatable tires comprising transverse series of plates arranged to lap at their adjacent ends and provided with slitted ears, the adjacent plates of each series being united by headed pintles which fit loosely in the slitted ears, as and for the purposes described.

4. A flexible armor for inflatable tires comprising the plates or scales, each pair of scales being provided on their contiguous edges with ears, and the coupling-pins arranged with their longitudinal axes at right angles to the length of said scales and having their headed ends loosely connected to the ears of the adjacent pairs of scales, substantially as described.

In testimony that I claim the foregoing as my own I have hereto affixed my signature in the presence of two witnesses.

ROBERT CLARK-HANSELL.

Witnesses:
  CHAS. HEBERER,
  J. W. HANSELL.